(12) United States Patent
Lee et al.

(10) Patent No.: US 12,498,870 B2
(45) Date of Patent: Dec. 16, 2025

(54) METHOD AND SYSTEM FOR ACCELERATION OR OFFLOADING UTILIZING A MULTIPLE INPUT DATA STREAM

(71) Applicants: Lemon Inc., Grand Cayman (KY); Douyin Vision Co., Ltd., Beijing (CN)

(72) Inventors: Chul Lee, Los Angeles, CA (US); Hui Zhang, Los Angeles, CA (US); Bo Li, Beijing (CN); Shan Xiao, Beijing (CN); Ping Zhou, Los Angeles, CA (US); Fei Liu, Los Angeles, CA (US)

(73) Assignees: Lemon Inc., Grand Cayman (KY); Douyin Vision Co., Ltd., Beijing (CN)

( * ) Notice: Subject to any disclaimer, the term of this patent is extended or adjusted under 35 U.S.C. 154(b) by 210 days.

(21) Appl. No.: 18/461,989

(22) Filed: Sep. 6, 2023

(65) Prior Publication Data

US 2023/0409226 A1 Dec. 21, 2023

(51) Int. Cl.
*G06F 3/06* (2006.01)
(52) U.S. Cl.
CPC .......... *G06F 3/0647* (2013.01); *G06F 3/0604* (2013.01); *G06F 3/067* (2013.01)
(58) Field of Classification Search
CPC ...... G06F 3/0647; G06F 3/0604; G06F 3/067; G06F 3/0659; G06F 3/0679; G06F 3/0611
See application file for complete search history.

(56) References Cited

U.S. PATENT DOCUMENTS

2022/0405014 A1* 12/2022 Chesterfield .......... G06F 3/0611
2024/0220347 A1* 7/2024 Han ...................... G06F 3/0659

OTHER PUBLICATIONS

NVM Express, NVM Command Set Specification, Jul. 23, 2021 (Year: 2021).*

* cited by examiner

*Primary Examiner* — Soe Hlaing
(74) *Attorney, Agent, or Firm* — Fish & Richardson P.C.

(57) ABSTRACT

Methods and systems for performing a hardware acceleration process that includes a hardware offloading engine. The hardware offloading engine includes an interface for communicating with a host device and a hardware accelerator for performing the acceleration process. The hardware accelerator has a processor configured to: receive from the interface a hardware offloading command from the host device, the hardware offloading command including an operation code, an input pointer, a total input size, and a first input size, parse the operation code, the input pointer, the total input size, and the first input size from the hardware offloading command, retrieve input data based on the input pointer and the total input size, separate the input data into a first data stream and a second data stream based on the first input size, and execute an offloaded operation on the first data stream and the second data stream.

17 Claims, 7 Drawing Sheets

METHOD AND SYSTEM FOR ACCELERATION OR OFFLOADING UTILIZING A MULTIPLE INPUT DATA STREAM

FIELD

The embodiments described herein pertain generally to non-volatile storage systems. More specifically, the embodiments described herein pertain to methods and systems for acceleration or offloading operations for non-volatile storage systems, for example, cloud computing services, in which offloading commands for hardware offloading operations include utilizing multiple input data streams.

BACKGROUND

Non-volatile storage, e.g., block-level storage, is a common form of storage that is used to store data on storage area networks, e.g., servers, in cloud-based storage environments, at a data center, etc. Cloud-based storage or storage device is a common product offered by cloud service providers (CSPs). In cloud-based storage or storage devices, data acceleration may be used by offloading operations from a host controller to the non-volatile storage system hardware, e.g., to the controllers having hardware, software, and/or firmware in communication with the non-volatile storage, for example, on the server or connected via a peripheral component interconnect express (PCIe) card.

SUMMARY

Methods and systems are described herein directed to utilizing multiple input data streams in two-way data stream protocols, such as NVMe, for hardware acceleration and/or hardware offloading operations in which the command prompt from the host device to the server has multiple input data streams consolidated in command descriptor format, e.g., in a single line in the command field. That is, the methods and systems are designed, programmed, or otherwise configured to prepare and/or parse an offloading command that includes a data field for at least two separate input buffers, in which the at least two separate input buffers are described with a single buffer descriptor, such that the offloading command may be sent over two-way data streaming protocols that support two-way data streams such that the input data with at least two separate input data streams may be processed at the server level, e.g., hardware offloading functionalities/operations for the acceleration process. As such, in the embodiments disclosed herein, performance in non-volatile storage systems may be optimized by leveraging two-way data streaming protocols to handle multiple input data streams which reduces latency, for example, by reducing the number of commands and/or communications between a host device and the server and/or storage device. While two-way data streaming protocols are discussed herein, it is appreciated that multi-way data streaming protocols may also be used in which the input data streams are combined in the command field, e.g., a three-way data streaming protocol, in which a first of the data stream command field includes two or more separate input data streams and the second of the data stream command field includes two or more separate input data streams.

In an example embodiment, a hardware offloading engine is provided. The hardware offloading engine includes an interface for communicating with a host device; and a hardware accelerator for performing the acceleration process. The hardware accelerator has a processor configured to receive from the interface a hardware offloading command from the host device, the hardware offloading command including an operation code, an input pointer, a total input size, and a first input size, parse the operation code, the input pointer, the total input size, and the first input size from the hardware offloading command, retrieve input data based on the input pointer and the total input size, separate the input data into a first data stream and a second data stream based on the first input size, and execute an offloaded operation on the first data stream and the second data stream based on the operation code.

In another example embodiment, a non-volatile storage device is provided. The non-volatile storage includes a non-volatile storage and a controller. The controller includes a hardware offloading engine for performing an acceleration process, the hardware offloading engine including: a first interface for communicating with a host device; a second interface for communicating with the non-volatile storage; and a hardware accelerator for performing the acceleration process. The hardware accelerator has a processor configured to: receive from the first interface a hardware offloading command from the host device, the hardware offloading command including an operation code, an input pointer, a total input size, and a first input size, parse the operation code, the input pointer, the total input size, and the first input size from the hardware offloading command, retrieve input data based on the input pointer and the total input size, separate the input data into a first data stream and a second data stream based on the first input size, and execute an offloaded operation on the first data stream and the second data stream based on the operation code.

In yet another example embodiment, a method for offloading an operation from a host device to a hardware offloading engine is provided. The method includes receiving a hardware offloading command from the host device, the hardware offloading command including an operation code, an input pointer, a total input size, and a first input size, parsing the operation code, the input pointer, the total input size, and the first input size from the hardware offloading command, retrieving input data based on the input pointer and the total input size, separating the input data into a first data stream and a second data stream based on the first input size, and executing an offloaded operation on the hardware offloading engine on the first data stream and the second data stream based on the operation code.

In another embodiment, a data center for hardware offloading is provided. The data center includes a host device, the host device including a device driver for communicating with a hardware offloading engine in communication with the non-volatile storage device; and a non-transitory computer readable medium having computer-executable instructions stored thereon that, upon execution, cause one or more processors to perform operations including preparing a hardware offloading command by providing an operation code, an input pointer, a total input size, and a first input size, in which the total input size and the first input size identify input data that includes two data streams that are combined, sending the hardware offloading command to the hardware offloading engine, and receiving a completion command after a read/write operation for an offloaded operation on the two data streams is completed. The data center may be in communication with a second data center that includes one or more non-volatile storage devices, each non-volatile storage device including a non-volatile storage, and a controller including the hardware offloading engine for performing an acceleration process, the hardware offloading engine including a first interface for communicating with the host device; a second interface for communicating with the non-volatile storage; and a hardware accelerator for performing the acceleration process, the hardware accelerator having a processor configured to: receive from the first interface the hardware offloading command from the host device, the hardware offloading command comprising an operation code, an input pointer, a total input size, and a first input size, parse the operation code, the input pointer, the total input size, and the first input size from the hardware offloading command, retrieve input data based on the input pointer and the total input size, separate the input data into a first data stream and a second data stream based on the first input size, and execute an offloaded operation on the first data stream and the second data stream based on the operation code In still yet another embodiment, a host device in communication with a non-volatile storage device is provided. The host device including a device driver for communicating with a hardware offloading engine in communication with the non-volatile storage device; and a non-transitory computer readable medium having computer-executable instructions stored thereon that, upon execution, cause one or more processors to perform operations including: preparing a hardware offloading command by providing an operation code, an input pointer, a total input size, and a first input size, in which the total input size and the first input size identify input data that includes two data streams that are combined, sending the hardware offloading command to the hardware offloading engine, and receiving a completion command after a read/write operation for an offloaded operation on the two data streams is completed.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
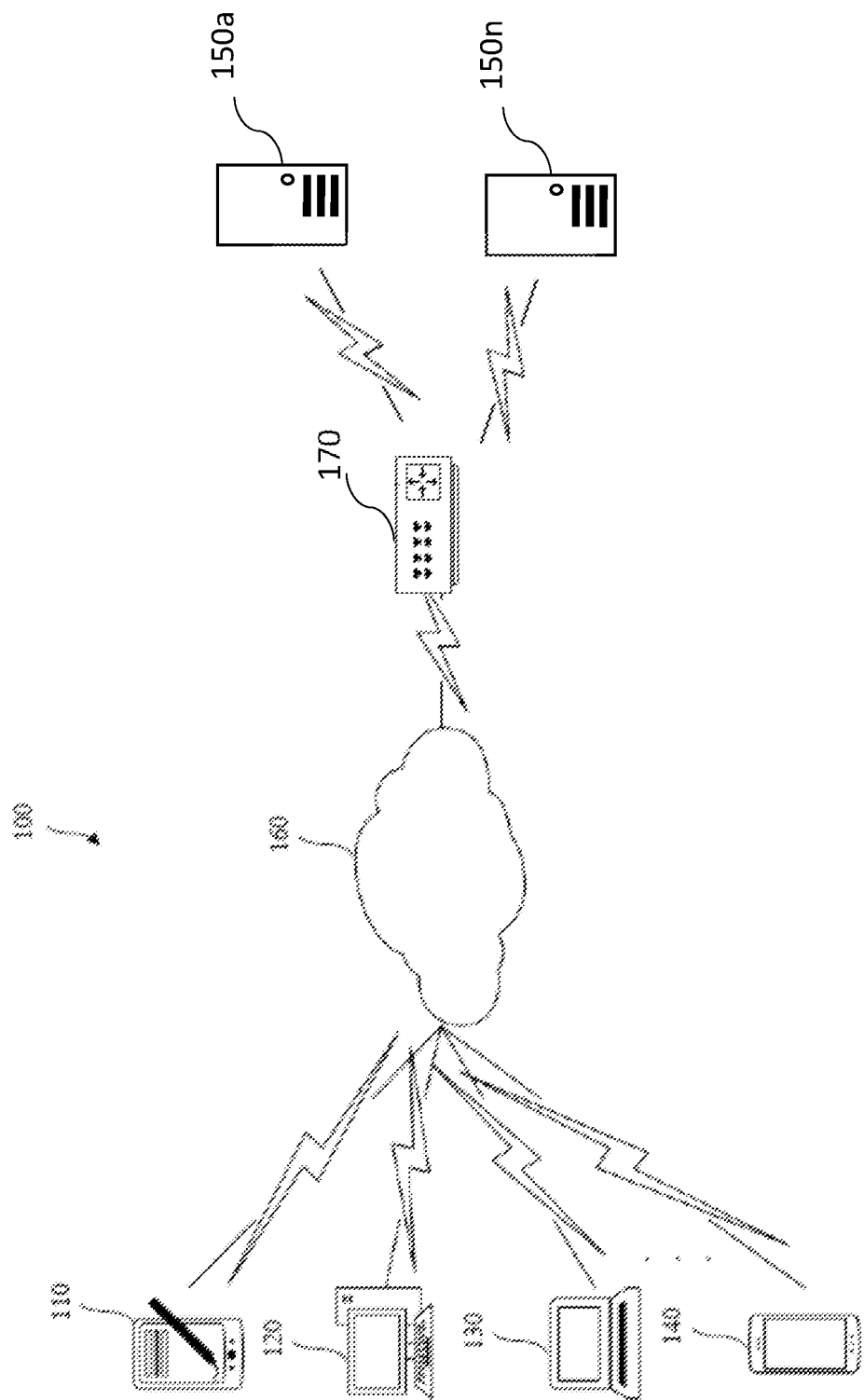
FIG. 1 is a schematic view of an example cloud-based storage system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "network" or a "computer network system" is a term of art and may refer to interconnected computing devices that may exchange data and share resources with each other. It is to be understood that the networked devices may use a system of rules (e.g., communications protocols, etc.), to transmit information over wired or wireless technologies.

As referenced herein, a "NVMe protocol or interface" may refer to non-volatile memory express protocol that provides a quick interface between computer processing units and storage devices, such as solid-state devices (SSDs). The NVMe protocol or interface may use a Peripheral Component Interconnect Express (PCIe) bus that provides a leaner interface for accessing the SSDs.

As referenced herein, a "module" may refer to a network, algorithm, programs, software, hardware, or any combination thereof configured or otherwise provided to perform the recited function.

In some computer networking systems, such as, cloud-based storage environments, e.g., in a data center, hardware offloading operations may be provided such that a host device having a controller, such as, a central processing unit (CPU), may offload certain functionalities or operations from the host device to a controller (or CPU) on a server connected to the storage device(s). For example, in some embodiments, the processor-enabled server, e.g., having hardware, software, and/or firmware operations, may include various hardware offloading engines, such as data streaming accelerators and in-memory analytics accelerators. In an example embodiment, the host device may be designed, programmed, or otherwise configured to provide (e.g., transmit/send) an offloading command to the server for hardware offloading operations/functionalities to the hardware offloading engines on the processor-enabled server (and/or the processor-enabled server may be designed, programmed, or otherwise configured to fetch the offloading command). Depending on the communication protocol/interface between the host device and the server and/or the type of hardware offloading engines, the offloading command may include (and/or be provided with), in a command descriptor format, data streams as a one-way data stream, a two-way data stream, or three-way data stream, or the like.

For one-way data streams, the hardware offloading engine(s) exclusively deals with using a single input data stream or a single output data stream, e.g., checksum operation. For two-way data streams, the hardware offloading engine(s) may be designed, programmed, or otherwise configured to use one input data stream and one output data stream, e.g., data transformation functions, such as, compression, encryption, filtering, and aggregation. For three-way data streams, the hardware offloading engine(s) may be designed, programmed, or otherwise configured to use two input data streams and one output data stream. That is, the hardware offloading engine is designed, programmed, or otherwise configured to process two input data streams, and to perform the offloading function on the two input data streams to generate the output data stream.

In some embodiments of hardware offloading engines, the hardware offloading engines may use three-way data streams to allow the use of the two input data streams by describing in the command descriptor format two separate inputs, e.g., using two separate descriptor fields, and one destination output. However, such three-way data streaming methods may not be usable in some existing protocols, e.g., two-way data streams communication protocols/interfaces between the host device and server. For example, in non-volatile memory express (NVMe) or non-volatile memory host controller interface protocols, e.g., communication protocols, the command descriptor for the NVMe interface only includes a single line for the address field of the input data stream and thus, cannot be used with three-way data streaming in which there are two separate inputs, e.g., three-way data streaming requires two separate addresses in the command descriptor format. However, as more host controller operations on the host device are being offloaded to hardware offloading engines on the server for better utilization of the host controller, particularly in the context of data analytics for big data and/or learning models, there may be a benefit to latency and performance if three-way data streams can be used in two-way data streaming protocols, e.g., to reduce the number of commands/communications between the host device and the server while allowing the data to be processed at the server level.

Methods and systems are described herein directed to utilizing multiple input data streams in two-way data stream protocols, such as NVMe, for hardware acceleration and/or hardware offloading operations in which the command prompt from the host device to the server has multiple input data streams consolidated in command descriptor format, e.g., in a single line in the command field. That is, the methods and systems are designed, programmed, or otherwise configured to prepare and/or parse an offloading command that includes a data field for at least two separate input buffers, e.g., data streams, in which the at least two separate input buffers are described with a single buffer descriptor, such that the offloading command may be sent over two-way data streaming protocols that support two-way data streams such that the input data with at least two separate input data streams may be processed at the server level, e.g., hardware offloading functionalities/operations for the acceleration process. As such, in the embodiments disclosed herein, performance in non-volatile storage systems may be optimized by leveraging two-way data streaming protocols to handle multiple input data streams which reduces latency, for example, by reducing the number of commands and/or communications between a host device and the server and/or storage device.

FIG. 1 is a schematic view of an example cloud-based storage system 100, arranged in accordance with at least some embodiments described herein.

The system 100 may include terminal devices 110, 120, 130, and 140, a network 160, a host controller 170 (e.g., a host device), and server(s) 150a . . . 150n. It is to be understood that FIG. 1 only shows illustrative numbers of the terminal devices, the network, the host device, and the server. The embodiments described herein are not limited to the number of the terminal devices, the network, the host device, and/or the server described. That is, the number of terminal devices, networks, the host device, and/or servers described herein are provided for descriptive purposes only and are not intended to be limiting.

In accordance with at least some example embodiments, the terminal devices 110, 120, 130, and 140 may be various electronic devices and/or a digital or virtual device. The various electronic devices may include but not limited to a mobile device such as a smartphone, a tablet computer, an e-book reader, a laptop computer, a desktop computer, and/or any other suitable electronic devices or host for a browser or application.

In accordance with at least some example embodiments, the network 160 may be a medium used to provide a communications link between the terminal devices 110, 120, 130, 140 and the server 150a . . . 150n. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the host controller 170 may be a client or a server that links the servers 150a . . . 150n together, e.g., in the data center or link other host controllers, e.g., in other data centers. The host controller 170 may be designed, programmed, or otherwise configured to send and/or receive applications, services, data, or the like to the connected devices/components.

In accordance with at least some example embodiments, the server 150a . . . 150n may be a server for providing various services, such as a server for providing cloud services (including e.g., cloud storage, retrieval service, big data analytics, machine learning, data mining, etc.) to end users using one or more of the terminal devices 110, 120, 130, and 140. The server 150a . . . 150n may be implemented as a data center that includes a distributed server cluster including multiple servers 150a . . . 150n or that includes a single server. In some embodiments, one or more data centers may be in communication with each other over network 160. The server 150a . . . 150n may also include a controller for controlling the hardware and/or storing software and firmware and providing the functionalities of the server.

In some embodiments, the server(s) 150a . . . 150n may include or be in communication with storage device(s), e.g., non-volatile memory (NVM) solid state drives (SSDs), e.g., flash memory, using various communication interfaces that allow for quick data storage and/or retrieval on/from the storage device(s). In some embodiments, the communication interface between the host device and sever 150a . . . 150n may be the NVMe or non-volatile memory host controller interface protocol. The NVMe protocol was developed in response to the need for a faster interface between central processing units (CPUs) and SSDs. NVMe may be a logical device interface for accessing the SSDs connected to the server controller, for example, via a Peripheral Component Interconnect Express (PCIe) bus that provides a leaner interface for accessing the SSDs.

In some example embodiments, the controller on the host device may send a command, e.g., a NVMe disk access command, such as for example read/write/delete commands, to the controller of the server using command queues. Controller administration and configuration may be handled via admin queues while input/output (I/O) queues may be used to handle data management. Each NVMe command queue may include one or more submission queues and one completion queue. As such, commands may be provided from the controller of the host device to the controller of the server via the submission queues and responses are returned to the controller on the host device via the completion queue.

For example, in an embodiment, the controller on the host device may create a read, write or delete command to execute along with the hardware offloading functionality/operation in the appropriate submission queue and then writes a tail doorbell register associated with that queue signaling to the controller of the server, e.g., connected to the SSD, that a submission entry is ready to be executed. The controller on the server may fetch the read, write or delete command and the hardware offloading command by using, for example, direct memory access (DMA) if the hardware offloading command resides in host device memory or directly if it resides in controller memory, and executes the read, write or delete and hardware offloading operation. Once execution is completed for the read, write or delete and hardware offloading operation, the controller on the server may write a completion entry to the associated completion queue. The controller on the host device may pull and process the completion queue entry and write a doorbell register for the completion queue indicating that the completion entry has been processed. The memory for the queues and data to transfer to and from the controller on the server may reside in the controller of the host device's memory space; however, the NVMe specification may also allow for the memory of queues and data blocks to be allocated in the controller's memory space. The NVMe standard has vendor-specific registers and command space that can be used to configure an NVMe storage device with customized configuration and commands.

An end user may use one or more of the terminal devices 110, 120, 130, and 140 to interact with the server(s) 150a . . . 150n via the network 160. In some embodiments, various applications, such as social media applications, social networking applications, shopping applications, gaming applications, or the like, may be installed on the terminal devices 110, 120, 130, and 140. In some embodiments, the end user may request big data analytics or data mining on data on the storage devices connected to the server(s) 150a . . . 150n and/or data residing or provided to the cloud computing system for supporting data analytics, learning models or the like.

It is to be understood that software applications or services according to the embodiments described herein and/or according to the services provided by the cloud service providers may be performed by the host controller 170, the server 150a . . . 150n and/or the terminal devices 110, 120, 130, and 140 (which may be referred to herein as user devices). Accordingly, the apparatus for the software applications and/or services may be arranged in the host controller 170, the server 150a . . . 150n, and/or in the terminal devices 110, 120, 130, and 140.

It is also to be understood that in a case that a service is not performed remotely, the system 100 may not include the network 160, but include only the terminal device 110, 120, 130, and 140, the host controller 170, and/or the server 150a . . . 150n.

It is further to be understood that the terminal device 110, 120, 130, and 140, the host controller 170, and/or the server 150a . . . 150n may each include one or more processors, firmware, and a storage device storing one or more programs. The terminal device 110, 120, 130, and 140, the host controller 170, and/or the server 150a . . . 150n may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
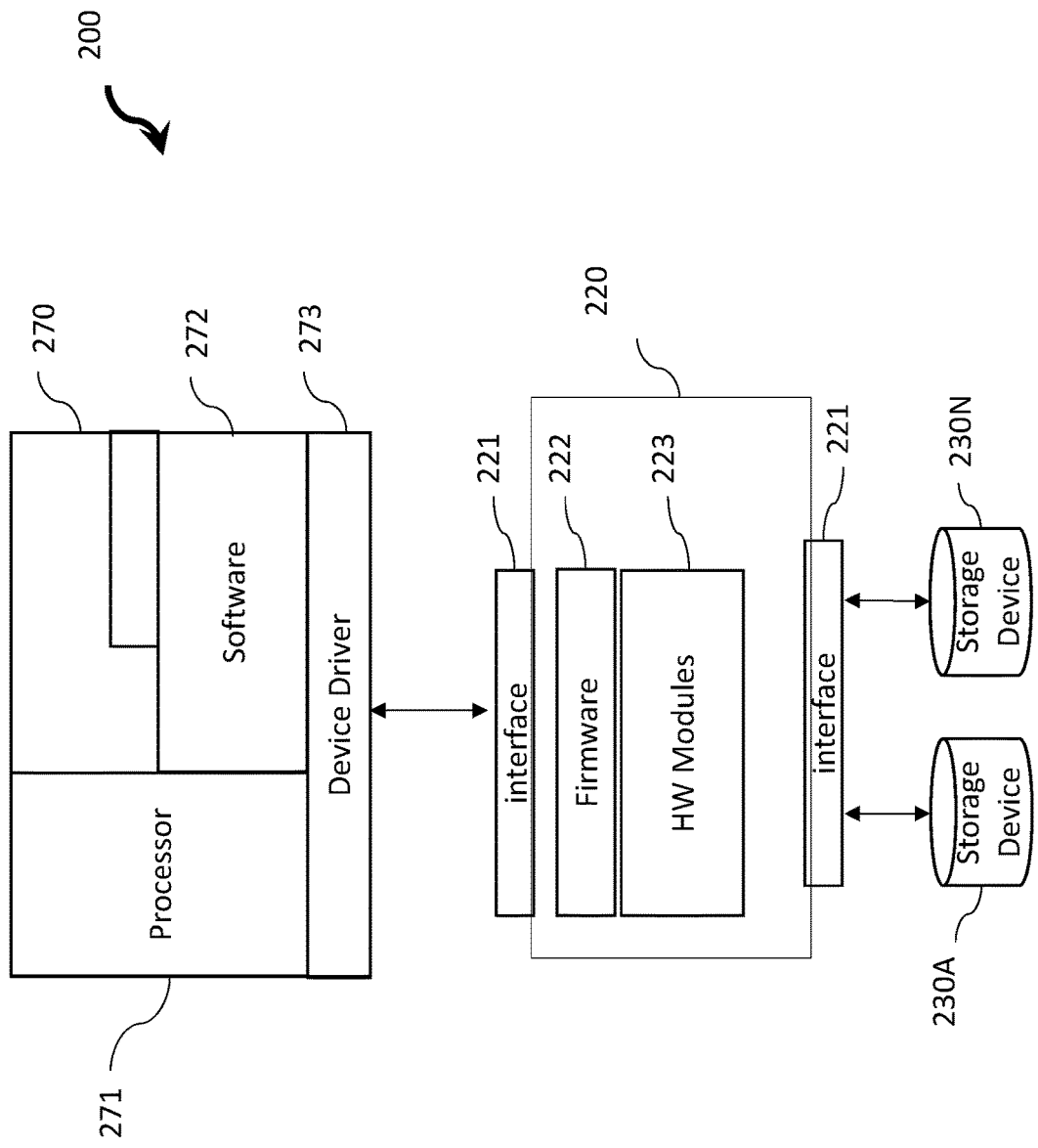
FIG. 2 is a schematic view of an example working node in a data center, arranged in accordance with at least some embodiments described herein.

FIG. 2 is a schematic view of an example working node for non-volatile storage device(s) in a data center architecture 200, arranged in accordance with at least some embodiments described herein.

The data center architecture 200 includes at least a host device 270, a hardware offloading engine 220, and one or more storage devices 230A . . . 230N. In an example embodiment, the data center architecture 200 may include one or more host devices 270 and/or one or more hardware offloading engine(s) 220, which may be on or in communication with one or more of the server(s), e.g., 150a . . . 150n of FIG. 1. The embodiments described herein are not limited to the number of the host devices, the hardware offloading engines, and/or the storage devices described. That is, the number of host devices, the hardware offloading engines, and/or the storage devices described herein are provided for descriptive purposes only and are not intended to be limiting.

In accordance with at least some example embodiments, the host device 270 may be the host controller 170 of FIG.

1 and may be in communication with one or more of the servers, e.g., 150*a* . . . 150*n*, and/or one or more of the hardware offloading engine(s) 220. In some embodiments, the host device 270 may be a controller, central processing unit (CPU), or software on one or more of the servers or on a central node in the data center architecture 200. In some embodiments, the host device 270 may include a processor 271 and one or more software applications 272 for operating, manipulating, reading, writing, deleting, storing, or otherwise accessing the data (and/or the block addresses) on the storage devices 230A . . . 230N via the hardware offloading engine 220. For example, when the host device 270 reads data from the storage devices 230A . . . 230N, the host device 270 may receive data from the hardware offloading engine 220. When the host device 270 writes data to the storage devices 230A . . . 230N, the host device 270 may send the data to the hardware offloading engine 220.

In some embodiments, the host device 270 may be designed, programmed, or otherwise configured to support big data analytics systems and/or, in combination, with business intelligence solutions that collect, process, scrub, and analyze big data, e.g., data mining, predictive analytics, real-time analytics, or the like. In some embodiments, the host device 270 may be designed, programmed, or otherwise configured to receive input data from the end user for the big data analytics and/or business intelligence solutions. The host device 270 may include one or more software applications 272 to support the big data analytics system on the frontend, e.g., presentation layer, and may include one or more of application programming interface(s) (APIs), software development kit(s) (SDKs), device driver(s) 273, runtime library(ies), software plug-in(s), management tool(s), or the like. The APIs and/or SDKs may be hierarchical to provide end users with a set of operations at different levels. The operations may be computationally intensive operations that require high amounts of processing capabilities, e.g., on the CPU. In some embodiments, the APIs and/or SDKs may be designed, programmed, or otherwise configured to translate operations to hardware understandable commands. The runtime library(ies) may be provided to provide a set of low-level functions at runtime for resource scheduling and task management. The software plugin(s) may be provided to allow targeting use cases to realize pluggable offloading. The management tools may be provided to monitor health and/or performance of the data center architecture 200 and/or components therein and administer jobs/operations for the components therein.

The device driver 273 may be provided to provide a software library for initializing hardware and manage access to the hardware by higher layers of software. In some embodiments, the device drivers may be designed, programmed, or otherwise configured to provide a Peripheral Component Interconnect Express (PCIe) device class hardware abstraction server for the hardware offloading engine 220 that supports NVMe protocols for storage access and transport and/or vendor specific commands. As such, the device drivers 273 may be designed, programmed, or otherwise configured to be in communication with the hardware offloading engine 220 and/or the server, e.g., 150*a* . . . 150*n*, e.g., create/send/transfer a hardware offloading command and/or send/receive/delete data.

In accordance with at least some example embodiments, the hardware offloading engine 220 may be software or a card insertable into the server (e.g. 150*a* . . . 150*n*), for example, an add-in card, such as a PCIe card or PCI card, to be connected directly to or remotely with, e.g., in communication with, the storage device 230A . . . 230N and/or the host device 270. The hardware offloading engine 220 may include one or more of an interface 221, one or more of processors, CPUs, or controllers, e.g., double data rate (DDR) memory controller(s), system management bus (SMBUS) management controller(s), NVMe controller(s), or the like, firmware 222, hardware accelerator modules 223, static random-access memory (SRAM), dynamic random-access memory (DRAM), or the like.

In some embodiments, the interface 221 may be designed, programmed, or otherwise configured to provide communications with the host device 270, e.g., interface for motherboard components to provide point-to-point connections and/or remote connections. In some embodiments, the interface 221 may be a PCIe card, e.g., slot interface with 16 lanes. In some embodiments, interface 221 may also be provided to communicate with the storage devices 230A . . . 230N and may be a PCIe card, e.g., slot interface with 4 lanes.

In some embodiments, the hardware accelerator modules 223 may be designed, programmed, or otherwise configured to perform hardware offloading functions/operations. The hardware offloading modules 223 may include and/or be implemented as software, firmware, application specific integrated circuits (ASICs), and/or field programmable gate arrays (FPGAs). The hardware offloading modules 223 may be connected to the host device 270 via interface bus 221 with the hardware offloading modules 223 interfacing with the host device 270 via the device drivers 273 that are specific to the particular software and hardware platform utilized for acceleration or hardware offloading, e.g., for the big data analytics. As such, the hardware offloading modules 223 may be designed, programmed, or otherwise configured to provide NVMe controller functionalities to the host device 270 and/or act as a host to the storage devices 230A . . . 230N. In some embodiments, the hardware offloading modules 223 may include hardware level functionalities including, but not limited to, selection, decompression, filtering, projection, aggregation, comparing, adding, subtraction, division, multiplication, shifting, inclusive or (OR), exclusive or (XOR), data mining, data analysis, and/or the like. In some embodiments, the hardware accelerator modules 223 may be linked dynamically to form a pipe-line given query execution framework, e.g., ASICs or FPGAs in series, parallel, or the like, and also may be re-programmable when end users want different execution(s), e.g., different operations will be offloaded.

In some embodiments, firmware 222 may be provided on-disk or as downloadable software on the hardware offloading engine 220 for providing low-level control for device specific hardware, e.g., on the hardware offloading engine 220. In some embodiments, the firmware 222 may be designed, programmed, or otherwise configured to manage multiple storage devices 230A . . . 230N attached thereto. The firmware 222 may also be designed, programmed, or otherwise configured to provide the software controls for the hardware accelerator modules 223 to provide the offloading functionalities/operations and may include one or more of a hardware abstract layer (HAL) module, a frontend module, a core module, a monitoring module for monitoring the health/performance and administrating operations/jobs for the hardware offloading engine 220, and a backend module. As such, the firmware 222 may further be designed, programmed, or otherwise configured to provide the hardware offloading engine 220 the virtual NVMe storage functionality for the host device 270, management of multiple storage devices 230A . . . 230N, and/or NVMe protocol offloading functionality/operation, e.g., query offloading functions using the hardware accelerator modules 223, e.g., for big data analytics acceleration processes.

The HAL module may include, but not limited to, a SMBUS module, non-volatile memory module, a serial peripheral interface (SPI) module, input/output (I/O) engine module, PCIe module, and an offloading engine module for providing the software layer for execution by the corresponding hardware. For example, in an embodiment, the HAL offloading engine module may be designed, programmed, or otherwise configured as a driver layer to provide APIs to the hardware offloading modules 223, e.g., execution instructions for the offloading functionalities/operations by the FPGAs and/or ASICs.

The frontend module may include, but not limited to, one or more handler modules, including, but not limited to, an administration command handler module, an I/O command handler module, a vendor command handler module, and an offload command handler module, which may be vendor specific, for providing the virtual NVMe device functionality and/or software layer for command execution for the associated hardware. For example, in an embodiment, the offload command handler module may be designed, programmed, or otherwise configured to be the frontend module for fetching host requests, e.g., the offloading command, and returning responses to the request back to the host device 270.

The core module may include, but not limited to a core API module, a firmware manager module, a virtual namespace manager module, a metadata manager module, a telemetry and logging module, SSD manger module, a card manager module, and a micro query processor module for providing the software and/or instructions for the hardware of the hardware offloading engine 220, e.g., core hardware, FPGAs, ASICs, etc. In an embodiment, for example, the micro query processor module may be designed, programmed, or otherwise configured to provide the instructions and/or commands for the offloading functionalities/operations, e.g., handling the offloading execution, such as, selection, comparison, decompression, decoding, filtering, projection, or the like.

The backend module may include, but not limited to the interface module 221 that is in communication with the storage devices 230A . . . 230N, e.g, data access layer. In some embodiments, the interface module 221 may include the software and/or provide the instructions/executions to implement the NVMe storage access and transport protocol, such as, the PCIe interface.

As such, in an example embodiment, the hardware offloading engine 220 may be designed, programmed, or otherwise configured to perform the offloading functionality/operations, as follows. In an example embodiment, initially, since different queries will require different types of computation and stages, a pipe-and-filter style architecture may be used, which may form the pipe-lining dynamically and provide parallel execution in each stage, e.g., by the hardware accelerator modules 223 and corresponding firmware 222. For example, in an example embodiment, when a query, e.g., command from the host device 270, only needs table scanning, the query may go through two filters at the firmware 222 level in which the two filters may be for the de-compressor module and decoder module and by-pass the remaining modules, e.g., in the firmware 222 and consequently the hardware accelerator modules 223. In other embodiments, the query may go through additional query processing, such as, through the filter module, the aggregation module, or the like over the scanned table. In such embodiments, the communication between the hardware accelerator modules 223 and the firmware 222 may be asynchronous and highly concurrent in which a pair of submission and completion queues per each offloading engine may be used for interacting/execution of the hardware accelerator modules 223 and the corresponding firmware 222.

In accordance with at least some example embodiments, the storage devices 230A . . . 230N may include non-volatile memory (NVM), such as flash memory. As such, the storage devices 230A . . . 230N may be NVM solid state drives (SSD) which may allow data storage and retrieval more quickly. As discussed above, the storage devices 230A . . . 230N may be in communication with the host device 270 via the hardware offloading engine 220.

Referring back to FIG. 2, in an example embodiment for the acceleration process in the data center architecture 200, the host device 270 may provide, and/or the hardware offloading engine 220 may fetch, vendor-specific offloading command entry(ies) for the hardware offloading functionality/operation (referred to herein as "offloading operation"). The hardware offloading command entry may be 32-bytes, 64-bytes, 128 bytes, 256 bytes, or the like to provide the instructions for the hardware offloading operation by the hardware offloading engine. The hardware offloading command entry may be provided in a command descriptor format and may include a hardware offloading operation code (e.g., opcode) layer, input pointer layer, input size layer, output size layer, and output size, with 8, 16, 32 or 64-bit field entries, as further discussed below.

The hardware offloading engine 220 may be designed, programmed, or otherwise configured to then parse the hardware offloading command entry to perform the necessary operation based on the hardware offloading command entry. In some embodiments, input data may be transferred from the host device 270 to the hardware offloading engine 220 along with the hardware offloading command entry, such that the offloading operation may be performed on the input data by the hardware offloading engine 220. For example, in an embodiment, when the parsed layer for the opcode from the hardware offloading command entry is "project," the hardware offloading engine 220 may offload the project operation from the host device 270, e.g., addition, subtraction, multiplication, comparison, filter, XOR, or the like, by being designed, programmed, or otherwise configured to initiate data transfer from the host device 270 (and/or the storage device 230A . . . 230N) and to perform the offloaded operation, e.g., via the FPGAs and/or ASICs. After the offloaded operation is executed by the hardware offloading engine 220, e.g., via the completion queues, the hardware offloading engine 220 may be designed, programmed, or otherwise configured to return the processed data to the host device 270, e.g., output data to the memory on the host device 270, execute the necessary write operation, e.g., to the storage device 230A . . . 230N, based on the output pointer and output size, and/or send/transfer a completion command after completion of the same. In some embodiments, the offloading command received by hardware offloading engine 220 from the host device 170 may contain an access address for accessing the input data, e.g., file path or the like, in which the hardware accelerator looks up the file path, locates the sought file data, reads blocks pertaining to the file data in 228, executes the acceleration process or operation, and transfers output results to host device 170.

Figure 3A:
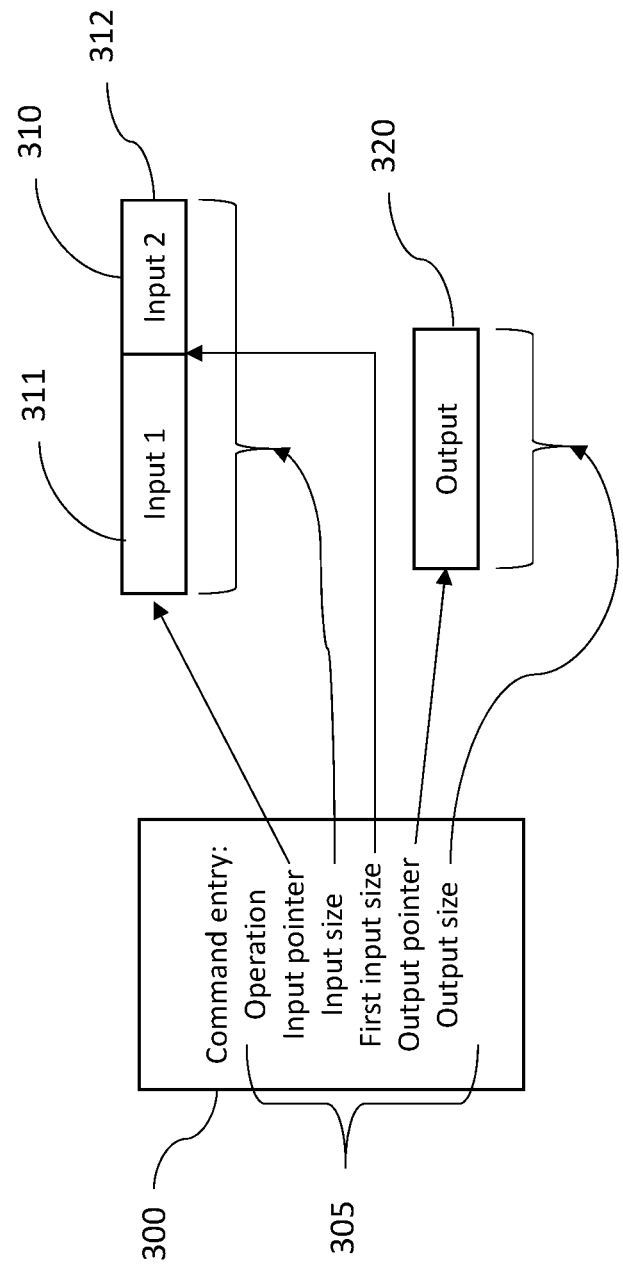
FIGS. 3A and 3B are schematic representations of an example offloading command, arranged in accordance with at least some embodiments described herein.
Figure 3B:
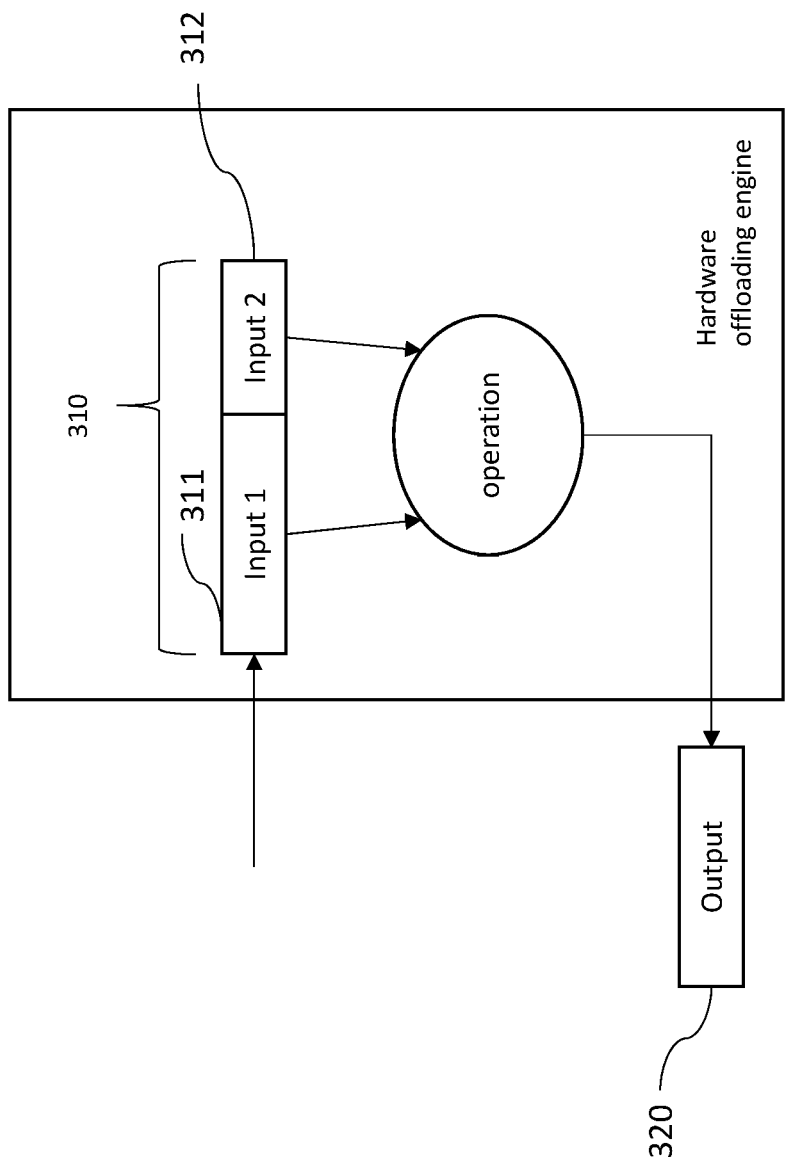
Figure 4:
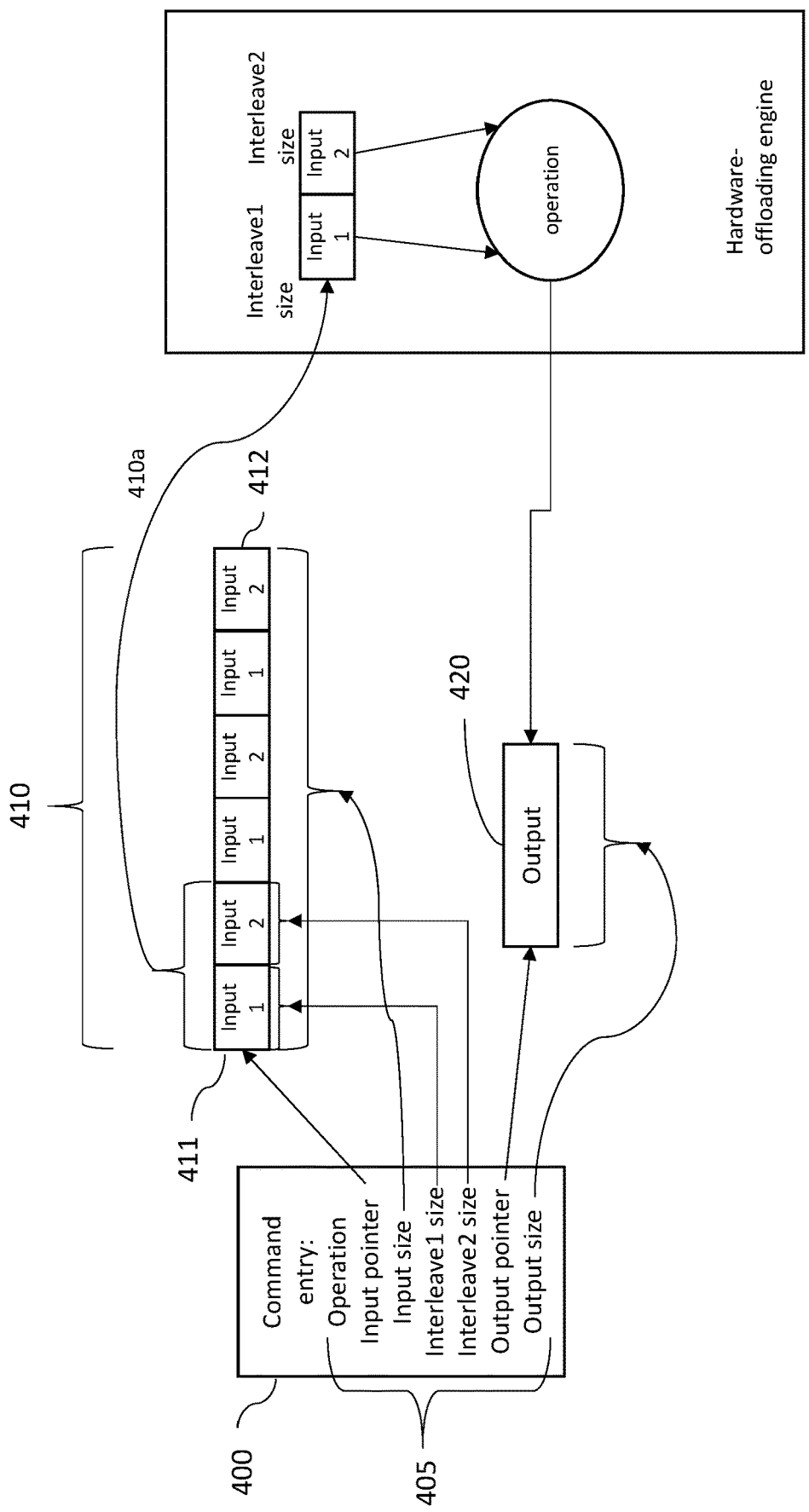
FIG. 4 is a representation of another example offloading command, arranged in accordance with at least some embodiments described herein.

As exemplarily illustrated in FIGS. 3A, 3B, and 4, in some example embodiments, the host device, e.g., 270, and/or the hardware offloading engine, e.g., 220, may be designed, programmed, or otherwise configured to utilize multiple input data streams, e.g., three-way data streams with at least two input streams, using two-way data streaming protocols that use two-way data streaming, e.g., NVMe protocol, in which two separate input buffers for two separate input data streams are consolidated and described by a single buffer descriptor. For example, in some embodiments, the at least two separate input data streams may be consolidated and/or read in a sequential manner and described in the single buffer descriptor field, in which a first input size may be used to differentiate between the two separate input data streams when the hardware offloading command entry is parsed. In some embodiments, when the input data stream has a large data size, e.g., greater than 32, 64, 128, 256, 512, 1000 MB, or the like, and/or to improve latency by performing the offloading operation sooner, the at least two separate input data streams may be consolidated in an interleaved manner and described in the single buffer descriptor field, in which the two data streams are interleaved as corresponding pairs, such that during parsing of the hardware offloading command entry, the two separate input data streams are retrieved as pairs, e.g., based on interleave sizes, so that the hardware offloading engine, e.g., 220, may begin execution of the operation after the first pair is received, e.g., the entire large input data streams do not have to fetched before beginning the offloaded operations. While two input data streams are discussed herein, such disclosure is not intending to be limiting. Rather, multiple input data streams, e.g., two, three, four, five, six, ten, twenty, or the like may be used based on CPU processing availabilities. Exemplary embodiments are discussed further below. Moreover, while the total input size, the first input size, and the first and second interleaved sizes are discussed herein, such disclosure is not intended to be limiting. Rather, various combinations of the input sizes and/or data size ratios may be used to identify the data to be combined. For example, in an embodiment, the total input size may be a calculated or determined value from the first input size and a second input size. In some embodiments, the total input size may be the total of the first interleaved size and the second interleaved size and the number of pairs of interleaved data. Moreover, in an embodiment, the first input size may be the second input data stream size, the size ratio of the first input data stream data to the second input stream data, or other data distinction indicators that may be used to distinguish the first input stream data from the second input stream data. As such, as used herein the term "first input size" is not intended to be limited to the first input data stream, but rather being used as a descriptor to differentiate between various sizes as discussed herein.

Referring back to FIGS. 3A and 3B, in some example embodiments, the host device, e.g., 270, may be designed, programmed, or otherwise configured to prepare the hardware offloading command entry 300 with the two or more separate input data streams consolidated in a sequential manner. For example, in an embodiment, the host device may receive a request to support big data analytics, such as, collecting, processing, scrubbing, and/or analyzing two or more input data streams. The host device may then be configured to receive and/or retrieve, e.g., read, the input data from the two or more input data streams and determine whether the operation from the request should be offloaded to the hardware offloading engine, e.g., 220, e.g., due to CPU limitations on the host device and optimization of the same, e.g., hardware acceleration. When it is determined to offload certain operations from the host device to the hardware offloading engine, the SDKs and/or APIs on the host device may be designed, programmed, or otherwise configured to analyze, process, and/or determine from the request(s) data describing and/or characterizing the request (and/or input data). As such, the host device may be configured to provide, send, and/or prepare the hardware offloading command entry 300 for the hardware offloading engine to perform the hardware offloading operation, e.g., in command descriptor format, including fields 305, such as, hardware offloading operation type (e.g., opcode), input points, total input size of the input data, input size of one or more of the input data from the separate input data streams, output points, output size, and/or flags, in which the data describing and/or characterizing the request (and/or input data) is used in the corresponding fields for the hardware offloading command entry. It is appreciated that in some embodiments, in order to utilize the two or more data input streams, the first input size field may be provided in the hardware offloading command entry to differentiate the boundary between the two data input streams, in which the two or more data input streams may be consolidated in a sequential manner. That is, the hardware offloading command entry 300 includes the input pointer to specify the address of the input data 310 including the input size for the two separate input data streams 311, 312 that are consolidated in the sequential manner and the first input size may then be used to identify the first input data stream 311 from the totality of the input data 310, e.g., based on input pointer and first input size defining the boundary of the first input data stream 311, since the two or more data streams are consolidated sequentially. While the first input size has been discussed herein with respect to the first input data stream, it is appreciated that such disclosure is not intended to be limiting. In some embodiments, the first input size may refer to the input size of the second input data stream, a size ratio of the first input data stream to the second input data stream, or the like.

In embodiments in which the host device transmits input data along with the hardware offloading command entry that includes instructions for the operation of the offloading operation by the hardware offloading engine, the device driver, e.g., 273, may be designed, programmed, or otherwise configured to consolidate and/or combine the input data 310 from the two separate input data streams 311, 312 sequentially as identified in the hardware offloading command entry, e.g., based on input size and input pointer. While the device driver is described herein as being configured to consolidate the input data 310 from the two separate input data streams 311, 312, such disclosure is not intended to be limiting. In some embodiments, the SDKs and/or APIs may be configured to consolidate the input data 310 from the two separate input data streams 311, 312, e.g., from the two separate sources. In some embodiments, the host device may include in the command a read operation that includes reading two separate input data streams from the storage device, e.g., 230A . . . 230N, for retrieving the input data. In some embodiments, the read operation may include reading from the storage device the input data streams and storing the input data from the two separate input data streams in memory on the host device prior to offloading the offloading operation to the hardware offloading engine.

In some embodiments, the hardware offloading command entry includes the output pointer and output size, such that the host device may be designed, programmed, and/or otherwise configured to receive the output data 320 from the hardware offloading engine, e.g., after execution of the offloaded operation, via the device driver. That is, after the hardware offloading engine completes the offloaded operation on the two separate input data streams 311, 312, the hardware offloading command entry may include the output pointer field and output size fields such that the output data 320 generated by the hardware offloading engine is returned to the memory on the host device at the identified output pointer specified address after completion of the offloaded operation. In some embodiments, the output size may be known by the host device prior to completion of the hardware offloading operation. In some embodiments, the output size may be updated after generation of the output data by the hardware offloading engine. In still other embodiments, the host device may only receive a completion command, for example, when the offloaded operation includes a read/write operation for the output data 320 on the storage device after completion of the offloaded operation.

As schematically illustrated in FIG. 3B, in some example embodiments, the hardware offloading engine may be designed, programmed, or otherwise configured to receive or fetch the hardware offloading command entry from the host device for performing the hardware offloading operation, e.g., via the interface, e.g., 221, and/or device driver, e.g., 273. The hardware offloading engine may be designed, programmed, or otherwise configured to parse the hardware offloading command entry, e.g., in command descriptor format, into the different fields for operation/execution thereon. For example, the hardware offloading engine may parse the hardware offloading command entry to identify the operation code, the input pointer, the total input size, the first input size, the output pointer, and the output size. As such, the hardware offloading engine may be designed, programmed, or otherwise configured to retrieve the complete input data 310 from the host device starting from the specified address at the input pointer and indicated input size and then internally execute the offloading operation, e.g., based on the opcode, e.g., select, project, or the like, on the two separate input data streams 311, 312, in which the boundary of the two separate input data streams 311, 312 may be identified by the first input size. After the operation is performed on the two separate input data streams 311, 312, the hardware offloading engine may generate output data 320, which may be returned to the host device or written to the storage device, as described above.

Referring to FIG. 4, in some example embodiments, the host device, e.g., 270, may be designed, programmed, or otherwise configured to prepare the hardware offloading command entry 400 with the two or more separate input data streams consolidated in an interleaved manner, when the input size of the input data exceeds a predetermined size, e.g., large data file greater than 32, 64, 128, 256, 512, 1000, 2000 MB, and/or to improve latency by performing the offloaded operation as soon as some of the input data is received/retrieved. For example, in an embodiment, the host device may receive a request to support big data analytics, such as, collecting, processing, scrubbing, and/or analyzing two or more input data streams. The host device may then be configured to receive and/or retrieve, e.g., read, the input data from the two or more input data streams and determine whether the operation from the request should be offloaded to the hardware offloading engine, e.g., 220, e.g., due to CPU limitations on the host device and optimization of the same, e.g., hardware acceleration. When it is determined to offload certain operations from the host device to the hardware offloading engine, the SDKs and/or APIs on the host device may be designed, programmed, or otherwise configured to analyze, process, and/or determine from the request(s) data describing and/or characterizing the request (and/or input data). As such, the host device may be configured to provide, send, and/or prepare the hardware offloading command entry 400 for the hardware offloading engine to perform the hardware offloading operation, e.g., in command descriptor format, including fields 405, such as, hardware offloading operation type (e.g., opcode), input points, total input size of the input data, a first interleave size, a second interleave size, output points, output size, and/or flags, in which the data describing and/or characterizing the request (and/or input data) is used in the corresponding fields for the hardware offloading command entry. It is appreciated that in some embodiments, in order to utilize the two or more data input streams, the first interleave size field and the second interleave size field may be provided in the hardware offloading command entry to differentiate the boundary between the two data input streams, in which the two or more data input streams may be consolidated in an interleaved manner. That is, when the input data 410 exceeds the predetermined size and/or to improve latency by allowing earlier execution of the offloaded operation, the first input data stream 411 and the second input data stream 412 may be partitioned into smaller fragments, portions, or packets, such that the fragments, portions, or packets of the first input data stream 411 and the second input data stream 412 are interleaved as fragmented, portioned, or packeted interleaved pairs 410*a* for execution thereon. In some embodiments, the hardware offloading command entry 400 includes the input pointer to specify the address of the input data 410 including the first interleave size and the second interleave size for the two separate interleaved pairs 410*a* for the data streams 411, 412 that are consolidated in the interleaved manner. The first interleave size may then be used to identify the first pair of the interleaved pair 410*a* for the first input data stream 411 and the second interleave size may then be used to identify the second pair of the interleaved pair 410*a* for the second input data stream 411, e.g., based on input pointer and first interleave size and the second interleave size defining the boundary of the first input data stream 411 and the second input data stream 412.

For example, in an example embodiment, when the total input size is 64 MB and the first input data stream is 32 MB and the second input data stream is 32 MB, the host device may be designed, programmed, or otherwise configured to interleave a fragment, portion, or packet of the first input data stream, e.g., 8 MB, with a fragment, portion, or packet of the second input data stream, e.g., 8 MB, until the total input data stream is interleaved.

In embodiments in which the host device transmits input data along with the hardware offloading command entry that includes instructions for the operation of the offloading operation by the hardware offloading engine, the device driver, e.g., 273, may be designed, programmed, or otherwise configured to consolidate and/or combine the input data 410 from the two separate input data streams 411, 412 in the interleaved manner as identified in the hardware offloading command entry, e.g., based on first interleave size, the second interleave size, and input pointer. While the device driver is described herein as being configured to consolidate the input data 410 from the two separate input data streams 411, 412, such disclosure is not intended to be limiting. In some embodiments, the SDKs and/or APIs may be configured to consolidate the input data 410 from the two separate input data streams 411, 412, e.g., from the two separate sources. In some embodiments, the host device may include in the command a read operation that includes reading two separate input data streams from the storage device, e.g., 230A . . . 230N, for retrieving the input data. In some embodiments, the read operation may include reading from the storage device the input data streams and storing the input data from the two separate input sources in memory on the host device prior to offloading the offloading operation to the hardware offloading engine.

In some embodiments, the command entry includes the output pointer and output size, such that the host device may be designed, programmed, and/or otherwise configured to receive the output data 420 from the hardware offloading engine, e.g., after execution of the offloaded operation, via the device driver. That is, after the hardware offloading engine completes the offloaded operation on the two separated input data streams 411, 412, the hardware offloading command entry may include the output pointer field and output size fields such that the output data 420 generated by the hardware offloading engine is returned to the memory on the host device at the identified output pointer specified address after completion of the offloaded operation. In some embodiments, the output size may be known by the host device prior to completion of the hardware offloading operation. In some embodiments, the output size may be updated after generation of the output data by the hardware offloading engine. In still other embodiments, the host device may only receive a completion command, for example, when the offloaded operation includes a read/write operation for the output data 420 on the storage device after completion of the offloaded operation.

In some example embodiments, the hardware offloading engine may be designed, programmed, or otherwise configured to receive or fetch the hardware offloading command entry from the host device for performing the hardware offloading operation, e.g., via the interface, e.g., 221, and/or device driver, e.g., 273. The hardware offloading engine may be designed, programmed, or otherwise configured to parse the hardware offloading command entry, e.g., in command descriptor format, into the different fields for operation/execution thereon. For example, the hardware offloading engine may parse the hardware offloading command entry to identify the operation code, the input pointer, the total input size, the first interleave size, the second interleave size, the output pointer, and the output size. As such, the hardware offloading engine may be designed, programmed, or otherwise configured to start retrieving the input data 410 from the host device starting from the specified address at the input pointer and indicated first interleave size and second interleave size and then internally execute the offloading operation, e.g., opcode, e.g., select, project, or the like, beginning with the interleaved pair 410a having the portion, fragment, or packet of the two separate input data streams 411, 412. After the operation is performed on interleaved pair 410a, the hardware offloading engine may start generating output data 420, which may be returned to the host device or written to the storage device, as described above. As such, by interleaving the input data from the two separate input data streams, the offloading operation may be started before the entirety of the input data 410 is retrieved or received by the hardware offloading engine, thus, allowing the pipelining of data transfer and offloading operations to be executed early, which may reduce latency.

Figure 5:
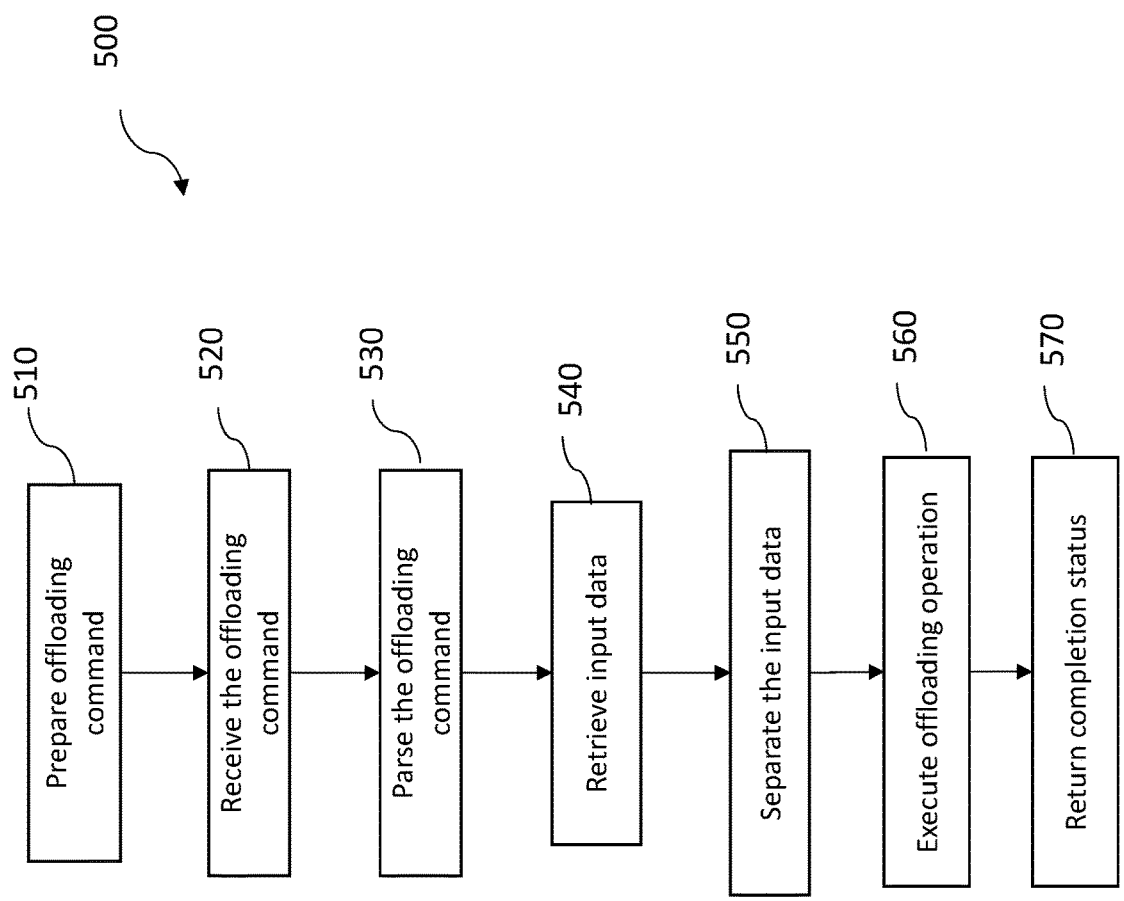
FIG. 5 is a flow chart illustrating an example offloading operation, in accordance with at least some embodiments described herein.

FIG. 5 is a flow chart illustrating an example processing flow 500 of offloading an operation in a computer network system, in accordance with at least some embodiments described herein.

Figure 6:
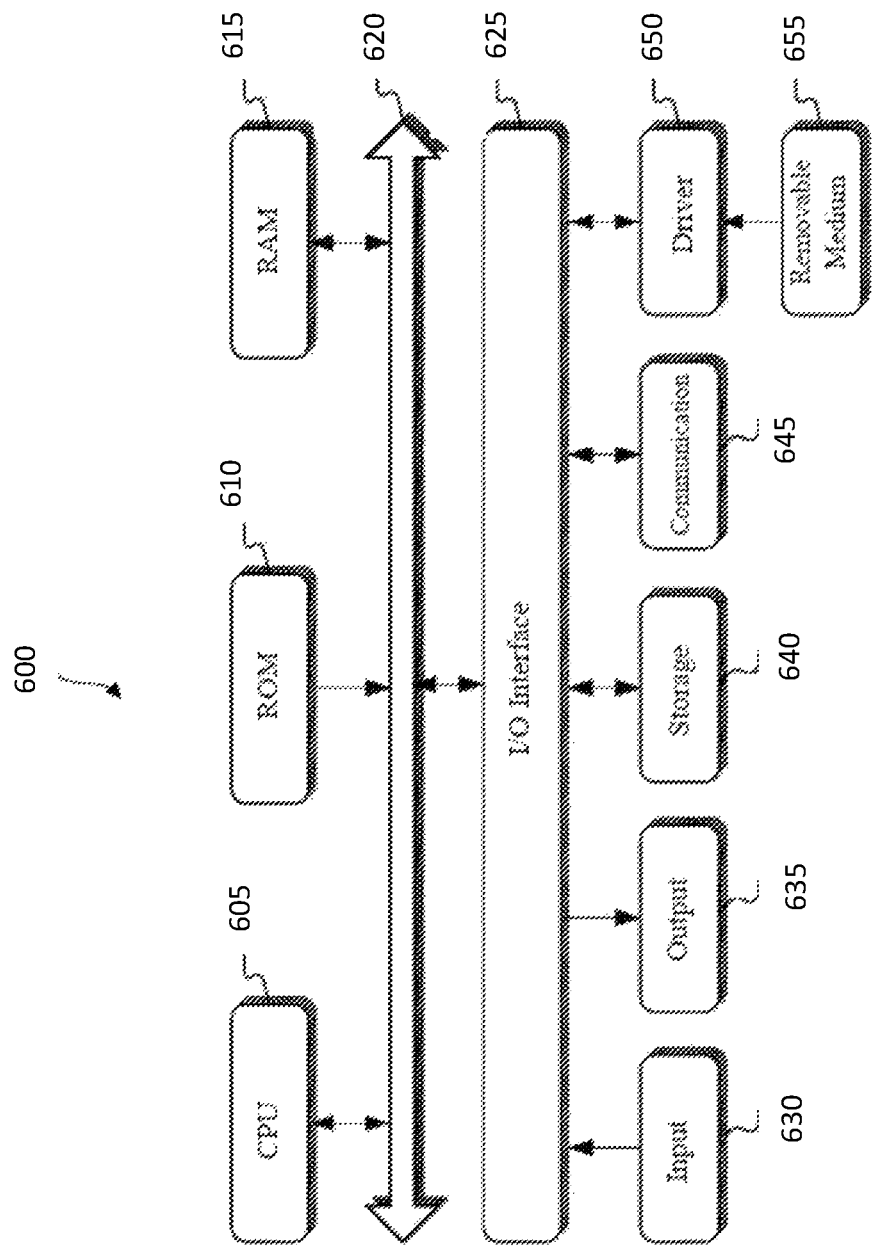
FIG. 6 is a schematic structural diagram of an example computer system applicable to implementing a device, arranged in accordance with at least some embodiments described herein.

It is to be understood that the processing flow 500 disclosed herein can be conducted by one or more processors such as a local device management CPU of the device, including e.g., the processor of one or more of the device 110, 120, 130, 140, 150a ... 150n, and/or 170 of FIG. 1, the CPU 605 of FIG. 6, and/or any other suitable processor, unless otherwise specified.

It is also to be understood that the processing flow 500 can include one or more operations, actions, or functions as illustrated by one or more of blocks 510, 520, 530, 540, 550, and 560. These various operations, functions, or actions may, for example, correspond to software, firmware, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 500, operations including initializations or the like may be performed. For example, system parameters and/or application parameters may be initialized. It is to be understood that the processes, operations, or actions described in FIGS. 2-4 may be implemented or performed by the processor. Processing flow 500 may begin at block 510.

At block 510 (Prepare offloading command), a processor on a host device, e.g., 270 of FIG. 2, may be designed, programmed, or otherwise configured to prepare a hardware offloading command, in which the hardware offloading command includes an operation code, an input pointer, a total input size, a first input size, an output pointer, and an output size. For example, as discussed above, the host device may be designed, programmed, or otherwise configured to utilize multiple data streams, e.g., three-way data streams with at least two input streams, using existing protocols for two-way data streaming, e.g., NVMe protocol, in which two separate input buffers for two separate input data streams are consolidated and described by a single buffer descriptor. In an embodiment, the host device may be designed, programmed, or otherwise configured to prepare the hardware offloading command entry with the two or more separate input data streams consolidated in a sequential manner. For example, in an embodiment, the host device may receive a request to support big data analytics, such as, collecting, processing, scrubbing, and/or analyzing two or more input data streams. As such, the host device may be configured to provide, send, and/or prepare the hardware offloading command entry for the hardware offloading engine to perform the hardware offloading operation, e.g., in command descriptor format, including fields, such as, hardware offloading operation type (e.g., opcode), input points, total input size of the input data, input size of one or more of the input data from the separate input data streams, output points, output size, and/or flags, in which the data describing and/or characterizing the request (and/or input data) is used in the corresponding fields for the hardware offloading command entry. It is appreciated that in some embodiments, in order to utilize the two or more data input streams, the first input size field may be provided in the hardware offloading command entry to differentiate the boundary between the two data input streams, in which the two or more data input streams may be consolidated in a sequential manner. That is, the hardware offloading command entry includes the input pointer to specify the address of the input data including the input size for the two separate input data streams that are consolidated in the sequential manner and the first input size may then be used to identify the first input data stream from the totality of the input data, e.g., based on input pointer and first input size defining the boundary of the first input data stream, since the two or more data streams are consolidated sequentially.

In other embodiments, the host device may be designed, programmed, or otherwise configured to prepare the hardware offloading command entry with the two or more separate input data streams consolidated in an interleaved manner, when the input size of the input data exceeds a predetermined size, e.g., large data file greater than 32, 64, 128, 256, 512, 1000, 2000 MB, and/or to improve latency by performing the offloaded operation as soon as some of the input data is received/retrieved. As such, the host device may be configured to provide, send, and/or prepare the hardware offloading command entry for the hardware offloading engine to perform the hardware offloading operation, e.g., in command descriptor format, including fields, such as, hardware offloading operation type (e.g., opcode), input points, total input size of the input data, a first interleave size, a second interleave size, output points, output size, and/or flags, in which the data describing and/or characterizing the request (and/or input data) is used in the corresponding fields for the hardware offloading command entry. It is appreciated that in some embodiments, in order to utilize the two or more data input streams, the first interleave size field and the second interleave size field may be provided in the hardware offloading command entry to differentiate the boundary between the two data input streams, in which the two or more data input streams may be consolidated in an interleaved manner. That is, when the input data exceeds the predetermined size and/or to improve latency by allowing earlier execution of the offloaded operation, the first input data stream and the second input data stream may be partitioned into smaller fragments, portions, or packets, such that the fragments, portions, or packets of the first input data stream and the second input data stream are interleaved as fragmented, portioned, or packeted interleaved pairs for execution thereon. In some embodiments, the hardware offloading command entry includes the input pointer to specify the address of the input data including the first interleave size and the second interleave size for the two separate interleaved pairs for the data streams that are consolidated in the interleaved manner. The first interleave size may then be used to identify the first pair of the interleaved pair for the first input data stream and the second interleave size may then be used to identify the second pair of the interleaved pair for the second input data stream, e.g., based on input pointer and first interleave size and the second interleave size defining the boundary of the first input data stream and the second input data stream.

Processing may proceed from block 510 to block 520.

At block 520 (Receive the offloading command), a processor on a hardware offloading engine, e.g., 220 of FIG. 2, in the same data center or a second data center in communication with the data center, may be designed, programmed, or otherwise configured to receive and/or fetch the hardware offloading command from the host device, in which the hardware offloading command includes at least an operation code, an input pointer, a total input size, and a first input size. The hardware offloading engine may be in communication with the host device via an interface, e.g., 221, and/or the device driver, e.g., 273, of the host device. Processing may proceed from block 520 to block 530.

At block 530 (Parse the offloading command), the processor on the hardware offloading engine may be designed, programmed, or otherwise configured to parse the hardware offloading command, e.g., in command descriptor format, into the different fields for operation/execution thereon. For example, in some embodiments, the hardware offloading engine may parse the hardware offloading command entry to identify the operation code, the input pointer, the total input size, the first input size, the output pointer, and the output size and determine whether the input data includes two separate input data streams combined in a sequential manner. In some embodiments, the hardware offloading engine may parse the hardware offloading command entry to identify the operation code, the input pointer, the total input size, the first interleave size, the second interleave size, the output pointer, and the output size and determine whether the input data includes two separate input data streams combined in an interleaved manner. As such, at block 530, the hardware offloading engine knows the operation, e.g., based on the opcode, to be unloaded on the hardware offloading engine as well as the input data used for processing.

Processing may proceed from block 530 to block 540.

At block 540 (Retrieve input data), the processor on the hardware offloading engine may be designed, programmed, or otherwise configured to retrieve input data based on the input pointer and the total input size, e.g., from the storage device and/or the host device. In an embodiment, when the input data is stored in memory on the host device, the device driver of the host device may be designed, programmed, or otherwise configured to transmit the input data based on the hardware offloading command entry, e.g., combine the input data from the at least two input data streams sequentially or in an interleaved manner. As such, the hardware offloading engine may be designed, programmed, or otherwise configured to start retrieving/receiving the input data from the host device starting from the specified address at the input pointer and indicated input size of the hardware offloading command entry. Processing may proceed from block 540 to block 550.

At block 550, (Separate the input data), the processor on the hardware offloading engine may be designed, programmed, or otherwise configured to separate the input data into a first data stream and a second data stream based on the first input size. In embodiments in which the input data is a sequential consolidation of a first input data stream and a second input data stream, the hardware offloading engine may be designed, programmed, or otherwise configured to separate the input data stream based on the first input size from the hardware offloading command entry. In embodiments in which the input data is an interleaved consolidation of the first input data stream and the second input data stream, the hardware offloading engine may be designed, programmed, or otherwise configured to separate the input data stream based on the first interleave size and the second interleave size and/or retrieve the input data as interleaved pairs having a portion, fragment, or packet for the two separate input data streams. It is appreciated that the term separate may include separating the two separate input data streams or identifying the input data as two separate input data streams. Processing may proceed from block 550 to block 560.

At block 560 (Execute offloading operation), the processor on the hardware offloading engine may be designed, programmed, or otherwise configured to execute the offloaded operation on the hardware offloading engine on the first data stream and the second data stream based on the operation code. That is, after the hardware offloading engine retrieves the input data, or starts retrieving the interleaved pair of the input data, from the host device, the hardware offloading engine may be designed, programmed, or otherwise configured to internally execute the offloading operation, e.g., based on the opcode, such as, select, project, or the like, on the two separate input data streams. After the operation is performed on the two separate input data streams, the hardware offloading engine may generate output data, which may be returned to the host device or written to the storage device, as described above.

FIG. 6 is a schematic structural diagram of an example computer system 600 applicable to implementing an electronic device (for example, the server, host device, or one of the terminal devices shown in FIG. 1), arranged in accordance with at least some embodiments described herein. It is to be understood that the computer system shown in FIG. 6 is provided for illustration only instead of limiting the functions and applications of the embodiments described herein.

As depicted, the computer system 600 may include a central processing unit (CPU) 605. The CPU 605 may perform various operations and processing based on programs stored in a read-only memory (ROM) 610 or programs loaded from a storage device 640 to a random-access memory (RAM) 615. The RAM 615 may also store various data and programs required for operations of the system 600. The CPU 605, the ROM 610, and the RAM 615 may be connected to each other via a bus 620. An input/output (I/O) interface 625 may also be connected to the bus 620.

The components connected to the/O interface 625 may further include an input device 630 including a keyboard, a mouse, a digital pen, a drawing pad, or the like; an output device 635 including a display such as a liquid crystal display (LCD), a speaker, or the like; a storage device 640 including a hard disk or the like; and a communication device 645 including a network interface card such as a LAN card, a modem, or the like. The communication device 645 may perform communication processing via a network such as the Internet, a WAN, a LAN, a LIN, a cloud, etc. In an embodiment, a driver 650 may also be connected to the I/O interface 625. A removable medium 655 such as a magnetic disk, an optical disk, a magneto-optical disk, a semiconductor memory, or the like may be mounted on the driver 650 as desired, such that a computer program read from the removable medium 655 may be installed in the storage device 640.

It is to be understood that the processes described with reference to the flowcharts of FIG. 5 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 645, and/or may be installed from the removable medium 655. The computer program, when being executed by the central processing unit (CPU) 605, can implement the above functions specified in the method in the embodiments disclosed herein.

Methods and systems described herein may utilize multiple input data streams in two-way data streaming protocols, such as NVMe, in which the command prompt from the host device to the server has multiple input data streams consolidated in command descriptor format, e.g., in a single line in the command field. That is, the methods and systems are designed, programmed, or otherwise configured to prepare and/or parse an offloading command that includes a data field for at least two separate input buffers, e.g., data streams, in which the at least two separate input buffers are described with a single buffer descriptor, such that the offloading command may be sent over two-way data streaming protocols that support two-way data streams such that the input data with at least two separate input data streams may be processed at the server level, e.g., hardware offloading functionalities/operations for the acceleration process. As such, in the embodiments disclosed herein, performance in non-volatile storage systems may be optimized by leveraging two-way data streaming protocols to handle multiple input data streams which reduces latency, for example, by reducing the number of commands and/or communications between a host device and the server and/or storage device.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A hardware offloading engine for performing an acceleration process, the hardware offloading engine comprising: an interface for communicating with a host device; and a hardware accelerator for performing the acceleration process, the hardware accelerator having a processor configured to: receive from the interface a hardware offloading command from the host device, the hardware offloading command comprising an operation code, an input pointer, a total input size, and a first input size, parse the operation code, the input pointer, the total input size, and the first input size from the hardware offloading command, retrieve input data based on the input pointer and the total input size, separate the input data into a first data stream and a second data stream based on the first input size, and execute an offloaded operation on the first data stream and the second data stream based on the operation code.

Aspect 2. The hardware offloading engine of Aspect 1, wherein the hardware offloading command further includes an output pointer and an output size, and wherein the processor is further configured to write an output of the offloaded operation based on the output pointer and the output size.

Aspect 3. The hardware offloading engine of any of Aspects 1-2, wherein the processor is configured to separate the input data that has the first data stream and the second data stream combined sequentially based on the first input size.

Aspect 4. The hardware offloading engine of any of Aspects 1-2, wherein the first input size includes a first interleaved size and a second interleaved size, and wherein the processor is configured to separate the input data that has the first data stream and the second data stream combined as interleaved data based on the first interleaved size and the second interleaved size.

Aspect 5. The hardware offloading engine of Aspect 4, wherein the processor is configured to execute the offloaded operation after receiving a first pair of interleaved data.

Aspect 6. The hardware offloading engine of any of Aspects 1-5, wherein the interface is a non-volatile memory express (NVMe) interface.

Aspect 7. The hardware offloading engine of Aspect 6, wherein the NVMe interface includes a peripheral component interconnect express (PCIe) interface.

Aspect 8. The hardware offloading engine of any of Aspects 1-7, wherein the operation code is one or more of selection, comparison, or projection.

Aspect 9. The hardware offloading engine of Aspect 8, wherein the projection includes one or more operations of compare, addition, subtraction, division, multiplication, shifting, inclusive or, or exclusive or (XOR).

Aspect 10. The hardware offloading engine of any of Aspects 1-9, wherein the hardware accelerator comprises one or more hardware accelerator modules for executing the offloaded operation such that the offloaded operation is offloaded from the host device.

Aspect 11. A non-volatile storage device comprising: a non-volatile storage; and a controller comprising: a hardware offloading engine for performing an acceleration process, the hardware offloading engine comprising: a first interface for communicating with a host device; a second interface for communicating with the non-volatile storage; and a hardware accelerator for performing the acceleration process, the hardware accelerator having a processor configured to: receive from the first interface a hardware offloading command from the host device, the hardware offloading command comprising an operation code, an input pointer, a total input size, and a first input size, parse the operation code, the input pointer, the total input size, and the first input size from the hardware offloading command, retrieve input data based on the input pointer and the total input size, separate the input data into a first data stream and a second data stream based on the first input size, and execute an offloaded operation on the first data stream and the second data stream based on the operation code.

Aspect 13. A host device configured to be in communication with a non-volatile storage device, the host device comprising: a device driver for communicating with a hardware offloading engine configured to be in communication with the non-volatile storage device; and a non-transitory computer readable medium having computer-executable instructions stored thereon that, upon execution, cause one or more processors to perform operations comprising: preparing a hardware offloading command by providing an operation code, an input pointer, a total input size, and a first input size, wherein the total input size and the first input size identify input data that includes two data streams that are combined, sending the hardware offloading command to the hardware offloading engine, and receiving a completion command after a read/write operation for an offloaded operation on the two data streams is completed.

Aspect 14. The host device of Aspect 13, wherein the input data includes the two data streams that are combined sequentially.

Aspect 15. The host device of Aspect 14, wherein the processor is configured to combine the two data streams sequentially and transfer the input data to the hardware offloading engine.

Aspect 16. The host device of Aspect 13, wherein the two data streams that are combined are combined in an interleaved manner, and wherein the first input size includes a first interleaved size and a second interleaved size.

Aspect 17. The host device of Aspect 16, wherein the processor is configured to combine the two data streams in the interleaved manner and transfer the input data to the hardware offloading engine.

Aspect 18. The host device of any of Aspects 13-17, wherein the device driver includes a non-volatile memory express (NVMe) interface.

Aspect 19. A method for offloading an operation from a host device to a hardware offloading engine, the method comprising: receiving a hardware offloading command from the host device, the hardware offloading command comprising an operation code, an input pointer, a total input size, and a first input size, parsing the operation code, the input pointer, the total input size, and the first input size from the hardware offloading command, retrieving input data based on the input pointer and the total input size, separating the input data into a first data stream and a second data stream based on the first input size, and executing an offloaded operation on the hardware offloading engine on the first data stream and the second data stream based on the operation code.

Aspect 20. The method of Aspect 19, wherein the hardware offloading command further includes an output pointer and an output size, and the method further comprising reading/writing an output of the offloaded operation based on the output pointer and the output size.

Aspect 21. The method of any of Aspects 19-20, wherein the separating the input data includes separating the input data that has the first data stream and the second data stream combined sequentially based on the first input size.

Aspect 22. The method of any of Aspects 19-20, wherein the first input size includes a first interleaved size and a second interleaved size, and wherein the separating the input data includes separating the input data that has the first data stream and the second data stream combined as interleaved data based on the first interleaved size and the second interleaved size.

Aspect 23. A data center comprising: a host device, the host device comprising: a device driver for communicating with a hardware offloading engine in communication with a non-volatile storage device; and a non-transitory computer readable medium having computer-executable instructions stored thereon that, upon execution, cause one or more processors to perform operations comprising: preparing a hardware offloading command by providing an operation code, an input pointer, a total input size, and a first input size, wherein the total input size and the first input size identify input data that includes two data streams that are combined, sending the hardware offloading command to the hardware offloading engine, and receiving a completion command after a read/write operation for an offloaded operation on the two data streams is completed.

Aspect 24. The data center according to Aspect 23, wherein the data center is in communication with a second data center, the second data center comprising: one or more non-volatile storage devices, each non-volatile storage device comprising: a non-volatile storage, and a controller comprising: the hardware offloading engine for performing an acceleration process, the hardware offloading engine comprising: a first interface for communicating with the host device; a second interface for communicating with the non-volatile storage; and a hardware accelerator for performing the acceleration process, the hardware accelerator having a processor configured to: receive from the first interface the hardware offloading command from the host device, the hardware offloading command comprising an operation code, an input pointer, a total input size, and a first input size, parse the operation code, the input pointer, the total input size, and the first input size from the hardware offloading command, retrieve input data based on the input pointer and the total input size, separate the input data into a first data stream and a second data stream based on the first input size, and execute an offloaded operation on the first data stream and the second data stream based on the operation code.

Aspect 25. The data center of Aspect 23, wherein the input data includes the two data streams that are combined sequentially.

Aspect 26. The data center of Aspect 25, wherein the processor of the host device is configured to combine the two data streams sequentially and transfer the input data to the hardware offloading engine.

Aspect 27. The data center of Aspect 23, wherein the two data streams that are combined are combined in an interleaved manner, and wherein the first input size includes a first interleaved size and a second interleaved size.

Aspect 28. The data center of Aspect 27, wherein the processor of the host device is configured to combine the two data streams in the interleaved manner and transfer the input data to the hardware offloading engine.

Aspect 29. The data center of any of Aspects 23-28, wherein the device driver includes a non-volatile memory express (NVMe) interface.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A hardware offloading engine for performing an acceleration process, the hardware offloading engine comprising:
   an interface for communicating with a host device; and
   a hardware accelerator for performing the acceleration process, the hardware accelerator having a processor configured to:
   receive from the interface a hardware offloading command from the host device, the hardware offloading command comprising an operation code, an input pointer, a total input size, and a first input size, wherein the first input size includes a first interleaved size and a second interleaved size,
   parse the operation code, the input pointer, the total input size, and the first input size from the hardware offloading command,
   retrieve input data based on the input pointer and the total input size,
   separate the input data into a first data stream and a second data stream based on the first input size, wherein the first data stream and the second data stream are combined as interleaved data based on the first interleaved size and the second interleaved size, and execute an offloaded operation on the first data stream and the second data stream based on the operation code.

2. The hardware offloading engine of claim 1, wherein the hardware offloading command further includes an output pointer and an output size, and wherein the processor is further configured to write an output of the offloaded operation based on the output pointer and the output size.

3. The hardware offloading engine of claim 1, wherein the processor is configured to separate the input data that has the first data stream and the second data stream combined sequentially based on the first input size.

4. The hardware offloading engine of claim 1, wherein the processor is configured to execute the offloaded operation after receiving a first pair of interleaved data.

5. The hardware offloading engine of claim 1, wherein the interface is a non-volatile memory express (NVMe) interface.

6. The hardware offloading engine of claim 5, wherein the NVMe interface includes a peripheral component interconnect express (PCIe) interface.

7. The hardware offloading engine of claim 1, wherein the operation code is one or more of selection, comparison, or projection.

8. The hardware offloading engine of claim 7, wherein the projection includes one or more operations of compare, addition, subtraction, division, multiplication, shifting, inclusive or, or exclusive or (XOR).

9. The hardware offloading engine of claim 1, wherein the hardware accelerator comprises one or more hardware accelerator modules for executing the offloaded operation such that the offloaded operation is offloaded from the host device.

10. A method for offloading an operation from a host device to a hardware offloading engine, the method comprising:
receiving a hardware offloading command from the host device, the hardware offloading command comprising an operation code, an input pointer, a total input size, and a first input size, wherein the first input size includes a first interleaved size and a second interleaved size,
parsing the operation code, the input pointer, the total input size, and the first input size from the hardware offloading command,
retrieving input data based on the input pointer and the total input size,
separating the input data into a first data stream and a second data stream based on the first input size, wherein the first data stream and the second data stream are combined as interleaved data based on the first interleaved size and the second interleaved size, and
executing an offloaded operation on the hardware offloading engine on the first data stream and the second data stream based on the operation code.

11. The method of claim 10, wherein the hardware offloading command further includes an output pointer and an output size, and the method further comprising reading/writing an output of the offloaded operation based on the output pointer and the output size.

12. The method of claim 10, wherein the separating the input data includes separating the input data that has the first data stream and the second data stream combined sequentially based on the first input size.

13. A data center comprising:
a host device, the host device comprising:
a device driver for communicating with a hardware offloading engine in communication with a non-volatile storage device; and
a non-transitory computer readable medium having computer-executable instructions stored thereon that, upon execution, cause one or more processors to perform operations comprising:
preparing a hardware offloading command by providing an operation code, an input pointer, a total input size, and a first input size, wherein the total input size and the first input size identify input data that includes two data streams that are combined in an interleaved manner, and wherein the first input size includes a first interleaved size and a second interleaved size,
sending the hardware offloading command to the hardware offloading engine, and
receiving a completion command after a read/write operation for an offloaded operation on the two data streams is completed.

14. The data center according to claim 13, wherein the data center is in communication with a second data center, the second data center comprising:
one or more non-volatile storage devices, each non-volatile storage device comprising:
a non-volatile storage, and
a controller comprising:
the hardware offloading engine for performing an acceleration process, the hardware offloading engine comprising:
a first interface for communicating with the host device;
a second interface for communicating with the non-volatile storage; and
a hardware accelerator for performing the acceleration process, the hardware accelerator having a processor configured to:
receive from the first interface the hardware offloading command from the host device, the hardware offloading command comprising an operation code, an input pointer, a total input size, and a first input size,
parse the operation code, the input pointer, the total input size, and the first input size from the hardware offloading command,
retrieve input data based on the input pointer and the total input size,
separate the input data into a first data stream and a second data stream based on the first input size, and
execute an offloaded operation on the first data stream and the second data stream based on the operation code.

15. The data center of claim 13, wherein the input data includes the two data streams that are combined sequentially.

16. The data center of claim 15, wherein the processor of the host device is configured to combine the two data streams sequentially and transfer the input data to the hardware offloading engine.

17. The data center of claim 13, wherein the processor of the host device is configured to combine the two data streams in the interleaved manner and transfer the input data to the hardware offloading engine.

* * * * *